(12) United States Patent
Higuchi et al.

(10) Patent No.: US 11,505,070 B2
(45) Date of Patent: Nov. 22, 2022

(54) OPERATING STATE DISPLAY METHOD AND OPERATING STATE DISPLAY SYSTEM

(71) Applicant: Nissan Motor Co., Ltd., Yokohama (JP)

(72) Inventors: Shinsuke Higuchi, Kanagawa (JP); Kazuma Sengoku, Kanagawa (JP); Junji Miyachi, Kanagawa (JP); Tetsuya Shinohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 295 days.

(21) Appl. No.: 16/772,594

(22) PCT Filed: Dec. 15, 2017

(86) PCT No.: PCT/JP2017/045211
§ 371 (c)(1),
(2) Date: Jun. 12, 2020

(87) PCT Pub. No.: WO2019/116577
PCT Pub. Date: Jun. 20, 2019

(65) Prior Publication Data
US 2020/0384859 A1     Dec. 10, 2020

(51) Int. Cl.
*B60L 3/00* (2019.01)
*B60L 50/61* (2019.01)
(Continued)

(52) U.S. Cl.
CPC ............ *B60L 3/00* (2013.01); *B60K 35/00* (2013.01); *B60K 37/02* (2013.01); *B60L 50/61* (2019.02); *B60L 58/13* (2019.02); *B60K 2370/156* (2019.05); *B60K 2370/174* (2019.05); *B60K 2370/52* (2019.05); *B60L 2240/54* (2013.01); *B60L 2250/16* (2013.01)

(58) Field of Classification Search
CPC ......... B60K 50/00; B60K 37/02; B60L 50/61; B60L 3/00; B60L 58/13
See application file for complete search history.

(56) References Cited

U.S. PATENT DOCUMENTS 5,815,072 A     9/1998  Yamanaka et al.
7,898,405 B2 *  3/2011  Burke .................... B60K 35/00
                                                    180/65.265
(Continued)

FOREIGN PATENT DOCUMENTS

JP     H10-026541 A    1/1998
JP     H11-022503 A    1/1999
(Continued)

*Primary Examiner* — Adi Amrany
(74) *Attorney, Agent, or Firm* — Young Basile Hanlon & MacFarlane, P.C.

(57) ABSTRACT

Provided is an operating state display method in an electric vehicle in which the drive electric power is supplied from a battery to a travel motor. The operating state display method includes an eco-level setting step of setting an eco-level with respect to an operating state of the electric vehicle based on a vehicle speed of the electric vehicle and an output of the travel motor, and a display step of displaying in a vehicle cabin an eco-level gauge configured to expand or contract according to the eco-level.

6 Claims, 15 Drawing Sheets

DURING ECO-DRIVE

DURING NON-ECO-DRIVE

(51) Int. Cl.
  *B60L 58/13* (2019.01)
  *B60K 35/00* (2006.01)
  *B60K 37/02* (2006.01)

(56) References Cited

U.S. PATENT DOCUMENTS

| | | | | |
|---|---|---|---|---|
| 8,669,855 | B2* | 3/2014 | Suzuki | B60W 50/14 |
| | | | | 340/438 |
| 2011/0125357 | A1* | 5/2011 | Harumoto | B60W 20/00 |
| | | | | 903/902 |
| 2015/0046029 | A1* | 2/2015 | Kosaka | B60K 37/02 |
| | | | | 701/36 |
| 2015/0106002 | A1* | 4/2015 | Seta | B60W 40/00 |
| | | | | 701/123 |
| 2017/0213137 | A1* | 7/2017 | Geller | G01C 21/3469 |
| 2017/0240174 | A1 | 8/2017 | Sawada et al. | |
| 2018/0304749 | A1* | 10/2018 | Cho | B60K 37/06 |
| 2018/0370365 | A1* | 12/2018 | Lee | B60K 37/06 |
| 2019/0001961 | A1* | 1/2019 | Kim | B60W 40/105 |

FOREIGN PATENT DOCUMENTS

| | | |
|---|---|---|
| JP | 2001-119802 A | 4/2001 |
| JP | 2009-008604 A | 1/2009 |
| JP | 2009-040197 A | 2/2009 |
| JP | 2010-038647 A | 2/2010 |
| JP | 2010-149833 A | 7/2010 |
| JP | 2013-086755 A | 5/2013 |
| JP | 2013-107641 A | 6/2013 |
| JP | 2013-177089 A | 9/2013 |
| WO | 2016/038680 A1 | 3/2016 |

* cited by examiner

DISPLAY A

DISPLAY B

DISPLAY C

DISPLAY D

DURING ECO-DRIVE

DURING NON-ECO-DRIVE

DURING REGENERATION

AT THE TIME OF CHANGE OF
ECO-DETERMINATION GAUGE

OPERATING STATE DISPLAY METHOD AND OPERATING STATE DISPLAY SYSTEM

TECHNICAL FIELD

The present invention relates to an operating state display method and an operating state display system for an electric vehicle.

BACKGROUND ART

A conventional operating state display device for an automobile is proposed in JP2011-251598A. In this operating state display device, the fuel economy state (eco-degree) of a vehicle driven by an internal combustion engine (engine) is displayed on a liquid crystal display portion in a vehicle cabin in the manner of a bar graph that changes stepwise. Specifically, in this operating state display device, display is performed in such a way as to increase the number of bar graphs displayed in the case of an operating state in which the fuel economy is good, thereby encouraging a driver to be aware of driving (eco-drive) that improves the fuel economy.

In the operating state display device described above, the fuel economy state is calculated based on a vehicle speed and an accelerator opening degree corresponding to an accelerator pedal operation amount of the driver, and based on the calculation result, the fuel economy good or bad state is displayed by the number of bar graphs. That is, in this operating state display device, display is performed in such a way as to change the number of bar graphs, indicating the eco-degree representing the energy consumption efficiency of the vehicle, according to the magnitude of the accelerator opening degree.

On the other hand, in recent years, electric vehicles, such as EV (Electric Vehicle) vehicles and hybrid vehicles, that travel by a driving force of a travel motor by supplying the electric power from a battery to the travel motor, have become popular.

SUMMARY OF INVENTION

In the electric vehicle, it is possible to display the drive output during the travel by calculating the motor output from the discharge electric power of the battery or the electric power supplied to the motor. A driver can visually recognize the motor output state associated with the accelerator operation and actually feels the acceleration of the vehicle so that it is possible to enjoy the travel unique to the electric vehicle that is different from the conventional internal combustion engine (engine). On the other hand, like in the vehicle driven by the conventional internal combustion engine, it is important to encourage the driver to be aware of the eco-drive. However, in the case of the electric vehicle, there are cases where even when the vehicle speed and the accelerator opening degree are the same, the target motor torque that is set according to the travel mode or the like differs so that the output of the travel motor differs.

Accordingly, there is a scene where the eco-degree corresponding to the energy efficiency of the electric vehicle differs even at the same accelerator opening degree, and therefore, display that properly matches the actual eco-degree cannot be performed by the conventional technique proposed in JP2011-251598A. As a result, that is a problem that proper display that encourages the driver to be aware of the eco-drive is difficult to realize in the electric vehicle.

The present invention has been made in view of these circumstances and has an object to provide an operating state display method and an operating state display system for an electric vehicle that enable proper display that encourages a driver to be aware of the eco-drive.

Means for Solving Problem

An aspect of the present invention provides an operating state display method in an electric vehicle in which a drive electric power is supplied from a battery to a travel motor. The operating state display method includes an eco-level setting step of setting an eco-level with respect to an operating state of the electric vehicle based on a vehicle speed of the electric vehicle and an output of the travel motor, and a display step of displaying in a vehicle cabin an eco-level gauge configured to expand or contract according to the eco-level.

Another aspect of the present invention provides an operating state display system installed in a hybrid vehicle in which a generator can charge a battery using a power of an engine, a drive electric power is supplied from the battery to a travel motor, and a motor output corresponding to an accelerator operation amount can be selectively changed between at least two stages. The operating state display system includes a mode switching switch for switching a travel mode of the hybrid vehicle, an eco-level display device provided to be visually recognizable by a driver of the hybrid vehicle and configured to display in a switching manner a first display indicating an operating state in which a power consumption efficiency of the travel motor is at least high, and a second display indicating an operating state in which the power consumption efficiency is lower than the first display, a power meter display device provided to be visually recognizable by the driver and configured to display an area where the motor output is indicated, and a display controller configured to control display states of the eco-level display device and the power meter display device. Further, the display controller includes a travel motor output calculation unit configured to calculate a value related to the motor output; a motor output threshold value setting unit configured to set a threshold value related to the motor output, and configured to, when a vehicle speed is high, set the threshold value to be greater than when the vehicle speed is low; an eco-level display control unit configured to cause the eco-level display device to display the first display when the value related to the motor output is smaller than the threshold value, and configured to cause the eco-level display device to display the second display when the value related to the motor output is greater than the threshold value; and a power meter display control unit configured to, in an area related to the motor output, display the value related to the motor output and display the threshold value so as to be comparable with the value related to the motor output.

DESCRIPTION OF EMBODIMENTS

First Embodiment

A first embodiment of the present invention will be described below with reference to FIGS. 1 to 4.

Figure 1:
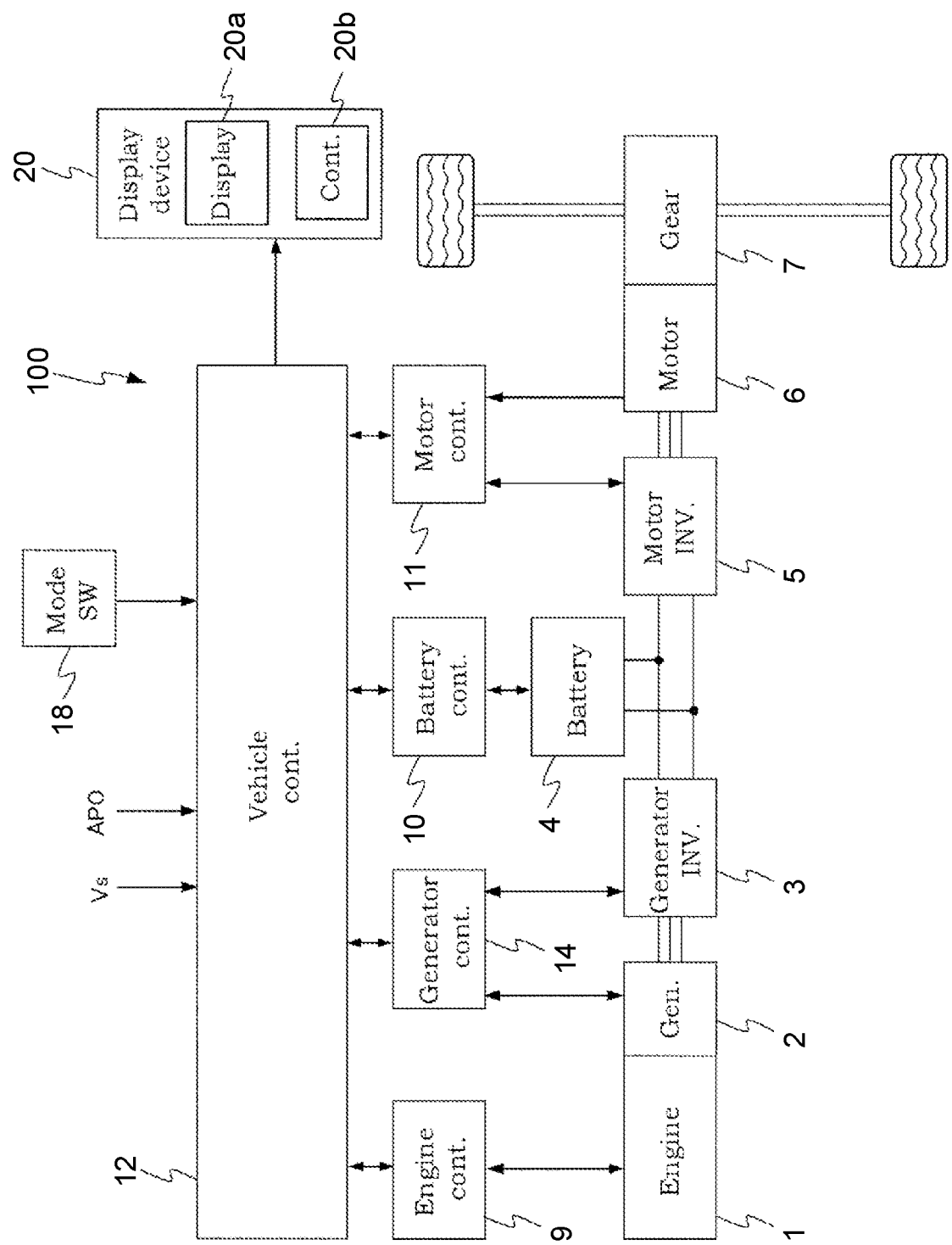
FIG. 1 is a diagram for explaining a schematic configuration of an electric vehicle in which an operating state display method of this embodiment is performed.

FIG. 1 is a diagram illustrating a schematic configuration of an electric vehicle 100 in which a fuel display method of this embodiment is performed.

The electric vehicle 100 of this embodiment is configured as a so-called series hybrid vehicle equipped with an engine 1 (internal combustion engine) as a power generation device, a motor for power generation (hereinafter referred to as a generator 2), and an electric motor (hereinafter referred to as a travel motor 6) that generates a driving force used for the travel.

Further, the electric vehicle 100 of this embodiment includes a generator inverter 3, a battery 4, a motor inverter 5, the travel motor 6, a speed reducer 7, an engine controller 9, a battery controller 10, a motor controller 11, a vehicle controller 12, a generator controller 14, a mode selection switch 18, and a display device 20.

The engine 1 is connected to the generator 2 via a non-illustrated gear and transmits to the generator 2 the power that causes the generator 2 to generate electric power. That is, the engine 1 of the electric vehicle 100 is used as a drive source for the power generation by the generator 2.

The generator 2 is configured to, in response to a command from the generator controller 14, perform cranking of the engine 1 and, in a power running state, motoring to rotate the engine 1 when starting the engine 1.

The generator inverter 3 is connected to the generator 2, the battery 4, and the motor inverter 5. In response to a command from the generator controller 14, the generator inverter 3 converts AC power generated by the generator 2 to DC power. Further, in response to a command from the generator controller 14, the generator inverter 3 converts DC power supplied from the battery 4 to AC power and supplies the AC power to the generator 2.

Based on a command from the motor controller 11, the motor inverter 5 converts DC power supplied from the battery 4 or the generator inverter 3 to AC power and supplies the AC power to the travel motor 6. Further, based on a command from the motor controller 11, the motor inverter 5 converts regenerative AC power generated by the travel motor 6 to DC power and supplies the DC power to the battery 4.

The travel motor 6 generates a driving force by AC current supplied from the motor inverter 5 and transmits the driving force to drive wheels via the speed reducer 7. Further, when the travel motor 6 is rotated by the drive wheels during deceleration, coasting, or the like of the vehicle, the travel motor 6 generates a regenerative driving force to recover kinetic energy of the vehicle as electric energy.

The engine controller 9 adjusts the intake air amount by a throttle actuator and the fuel injection amount Fij by injectors so that the operating points of the engine 1 (the engine torque Te and the engine speed Ne) approach an engine torque command value and an engine speed command value received from the vehicle controller 12.

Based on the charge voltage and the charge current of the battery 4, the battery controller 10 measures the state of charge (SOC: State Of Charge) and the charge/discharge power, and transmits the measured information to the vehicle controller 12. Further, based on the temperature, the internal resistance, the SOC, and the charge/discharge power of the battery 4, the battery controller 10 calculates an inputtable electric power and an outputtable electric power of the battery 4, and transmits the calculated values to the vehicle controller 12.

The motor controller 11 performs switching control of the motor inverter 5 according to the states, such as the rotation speed and the voltage of the travel motor 6, so that the travel motor torque achieves a motor torque command value from the vehicle controller 12.

The vehicle controller 12 calculates a motor torque command value for the travel motor 6 according to a travel mode by referring to a predetermined map based on an accelerator opening degree APO corresponding to an accelerator pedal operation amount of a driver detected by a non-illustrated accelerator pedal sensor, and a vehicle speed Vs detected by a non-illustrated vehicle speed sensor. This map is a map defining the motor torque command value and the motor rotation speed relative to the current accelerator opening degree APO and vehicle speed Vs. This map is set such that the greater the vehicle speed Vs or the greater the accelerator opening degree, the greater the target motor torque. In this embodiment, as the travel mode to be selected, the sport travel mode and the eco-travel mode can be selectively switched. In the sport travel mode, the motor torque associated with the same accelerator opening degree APO is set to be greater than that in the eco-travel mode. The vehicle controller 12 refers to the map and calculates the motor torque command value and the motor rotation speed from the current accelerator opening degree APO and vehicle speed Vs.

Then, the vehicle controller 12 calculates a motor output OP (corresponding to a drive electric power) of the travel motor 6 based on the motor rotation speed, the voltage, the motor torque command value, and so on.

Further, based on the motor output OP and the SOC, the vehicle controller 12 calculates a target power-generation electric power in the power generation using the engine 1. Based on the SOC of the battery 4, the sound vibration performance, and the efficiency of the engine 1, the vehicle controller 12 calculates an engine torque Te and an engine speed Ne of the engine 1 while satisfying the target power-generation electric power. Then, the vehicle controller 12 transmits the calculated engine torque Te and engine speed Ne to the engine controller 9.

Further, the vehicle controller 12 calculates a rotation speed command value according to the engine speed Ne and transmits it to the generator controller 14.

The generator controller 14 performs switching control of the generator inverter 3 according to the states, such as the rotation speed detection value and the voltage of the generator 2, so that the generator rotation speed coincides with the generator rotation speed command value from the vehicle controller 12.

The engine controller 9, the battery controller 10, the motor controller 11, the vehicle controller 12, and the generator controller 14 are configured as an electronic control unit formed by a microcomputer including various calculation/control devices such as a CPU, various storage devices such as a ROM and a RAM, an input/output interface, and so on.

In this embodiment, the vehicle controller 12 is programmed to perform processes (processes of steps S110 to S160 in FIG. 6) in the operating state display method according to this embodiment.

The mode selection switch 18 is a switch for selectively switching the travel mode of the electric vehicle 100 between at least the sport travel mode and the eco-travel mode. For example, the mode selection switch 18 is configured to be manually operated by the driver and so on. The sport travel mode is a mode in which the motor torque according to a certain accelerator opening degree APO is set to be relatively large. On the other hand, the eco-travel mode is a mode in which the motor torque according to a certain accelerator opening degree APO is set to be relatively small. The regenerative braking force in the sport travel mode is set to be smaller than that in the eco-travel mode.

The display device 20 includes a meter panel 20a as a display arranged in a vehicle cabin of the electric vehicle 100, and a display control controller 20b that performs control for image display of the meter panel 20a.

Figure 2:
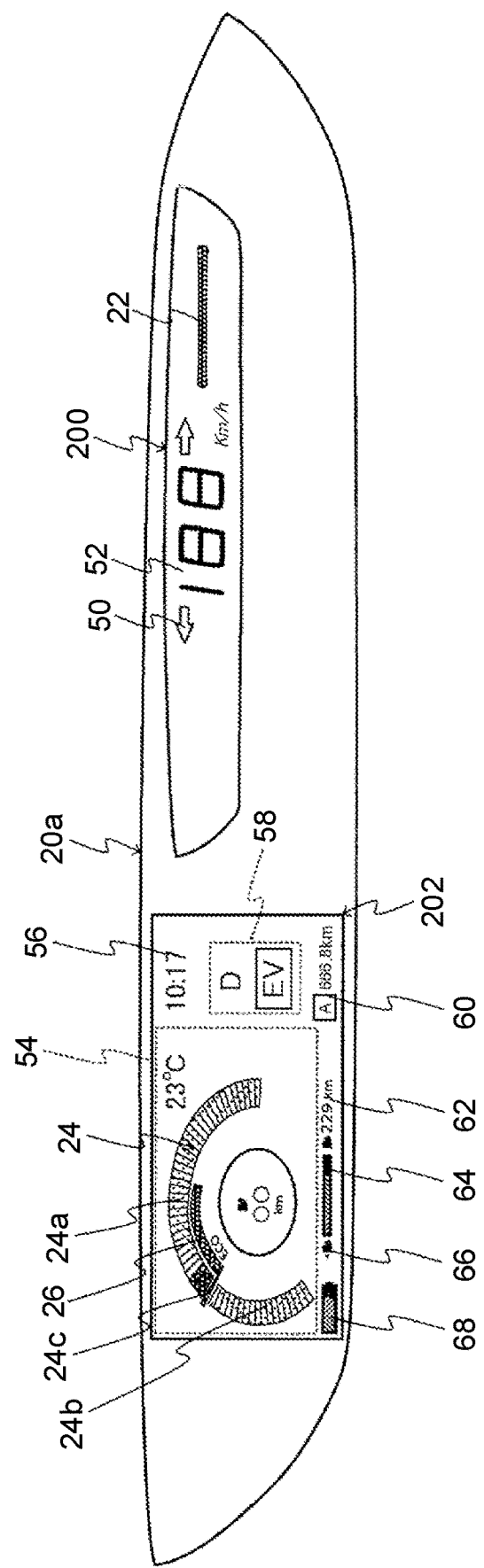
FIG. 2 is a diagram for explaining the display manner of a meter panel according to an operating state display system of this embodiment.

FIG. 2 is a diagram for explaining the display manner of the meter panel 20a. The meter panel 20a is realized by, for example, a liquid crystal display, organic EL, LEDs, or the like, and can display various information according to an operating state of the electric vehicle 100. The meter panel 20a is formed by, for example, a so-called instrument panel arranged in front of a driver's seat of the electric vehicle 100.

The meter panel 20a of this embodiment includes a first display area 200 located at a right-side position in the figure, and a second display area 202 located at a left-side position in the figure.

The first display area 200 includes a direction indication display portion 50, a vehicle speed display portion 52, and so on, in addition to an eco-level gauge 22 that expands or contracts according to a later-described eco-level Ede. That is, in this embodiment, the first display area 200 forms an eco-level display area.

Herein, for example, the eco-level Ede is a value that stepwise evaluates, using a plurality of predetermined threshold values, the height of a mileage per unit power consumption amount ("electricity efficiency") in the electric vehicle 100 according to a motor output OP that is determined based on an accelerator pedal operation amount of the driver and so on. That is, the eco-level Ede is an index amount that stepwise indicates to what degree the current operating state of the electric vehicle 100 is good in electricity efficiency (energy consumption efficiency).

Therefore, in this embodiment, by performing display to expand or contract the eco-level gauge 22 depending on the height of the eco-level Ede associated with the motor output OP, it is possible to provide an index, indicating how high the eco-degree of the current operating state is, to the driver. The display manner of the eco-level gauge 22 will be described in more detail.

FIGS. 3A to 3D are diagrams for explaining the manner of expansion and contraction of the eco-level gauge 22 in this embodiment. As illustrated, the eco-level gauge 22 in this embodiment performs display of four step lengths in order of the magnitude of the eco-level Ede. The eco-level gauge 22 is also called a so-called ambient.

Figure 3A:
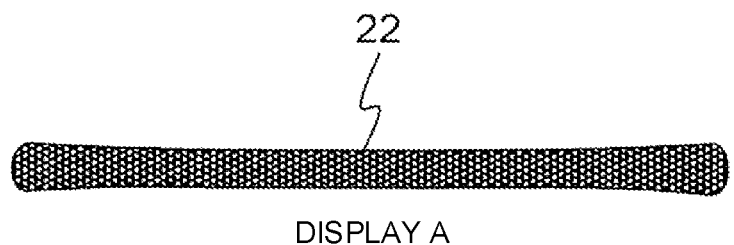
FIG. 3A is a diagram illustrating a display A of an eco-level gauge.
Figure 3B:
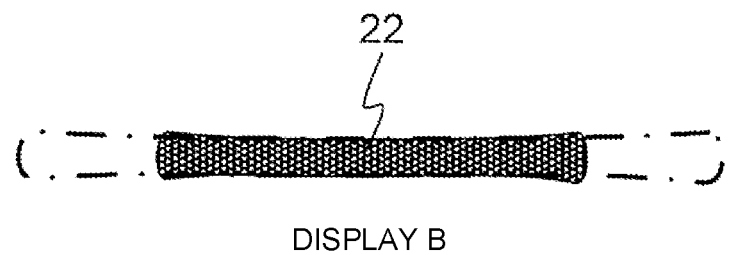
FIG. 3B is a diagram illustrating a display B of the eco-level gauge.
Figure 3C:
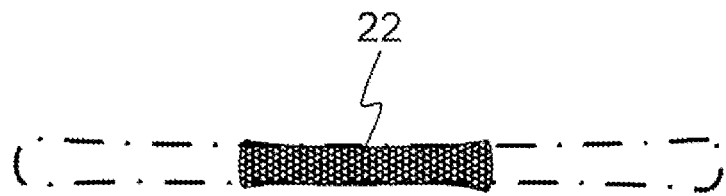
FIG. 3C is a diagram illustrating a display C of the eco-level gauge.
Figure 3D:
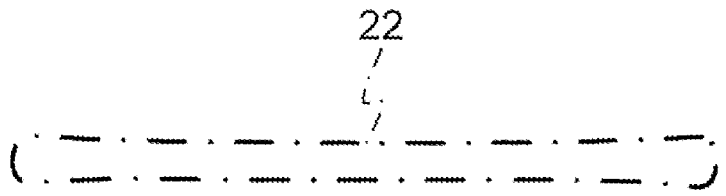
FIG. 3D is a diagram illustrating a display D of the eco-level gauge.

Specifically, the eco-level gauge 22 in this embodiment has, in order of higher to lower eco-level Ede, display states of a display A illustrated in FIG. 3A, a display B illustrated in FIG. 3B, a display C illustrated in FIG. 3C, and a display D illustrated in FIG. 3D.

More specifically, in the display A (eco-level III) indicating the highest state of the eco-level Ede, the eco-level gauge 22 is displayed with a maximum length. In the display B (eco-level II) indicating the second-highest state of the eco-level Ede, the eco-level gauge 22 is displayed with a length that is about ⅔ of the length of the display A. Further, in the display C (eco-level I) indicating the third-highest state of the eco-level Ede, the eco-level gauge 22 is displayed with a length that is about ⅓ of the length of the display A.

Further, in the display D (eco-level 0) indicating the lowest state of the eco-level Ede, the eco-level gauge 22 is displayed with a length of zero. That is, the eco-level gauge 22 is not displayed in the lowest state of the eco-level Ede.

Consequently, it is possible to realize the display of the eco-level gauge 22 that expands or contracts in conjunction with the change in the eco-level Ede associated with the driving operation (accelerator pedal operation) of the driver and so on. As a result, by referring to the length of the eco-level gauge 22 displayed in the first display area 200, the driver and so on can definitely and intuitively recognize whether or not the current operating state of the electric vehicle 100 is the eco-drive state of the energy consumption efficiency.

Referring back to FIG. 2, the second display area 202 includes a vehicle energy state display portion 54, a time display portion 56, a travel mode display portion 58 that displays the travel mode and the range that are currently set, a trip information display portion 60 that displays a mileage traveled during one trip, a mileage display portion 62 that displays a mileage based on the remaining amount of fuel stored in a non-illustrated fuel tank for the power generation of the engine 1, a fuel remaining amount display portion 64 that displays the remaining amount of the fuel in the fuel tank, a refueling port position display portion 66 that displays a position (right position or left position) where a refueling port for supplying fuel is disposed in the electric vehicle 100, and a charge amount display portion 68 that displays the charge amount (SOC) of the battery 4.

In particular, in this embodiment, the vehicle energy state display portion 54 displays a power meter 24 that displays the number of lighting scales Nsc according to a power consumption Pc of the electric vehicle 100, and an eco-determination gauge 26 for determining that the operating state of the electric vehicle 100 is the eco-drive state.

The power meter 24 is formed by a plurality of scales arranged in a generally arc shape. More specifically, the power meter 24 includes a power running scale 24a, a regeneration scale 24b, and a power running/regeneration boundary 24c indicating the boundary therebetween.

The power meter 24 is configured such that, according to the magnitude of the power consumption Pc (>0) during the power running of the travel motor 6, the power running scale 24a of the number of lighting scales Nsc corresponding to the magnitude of the power consumption Pc is lit from the power running/regeneration boundary 24c as the reference point.

That is, the power running scale 24a is configured such that as the motor output OP increases by the accelerator operation of the driver and so on to increase the power consumption Pc, more scales are lit and displayed along the clockwise direction of the arc from the power running/regeneration boundary 24c as the reference point.

Further, the power meter 24 is configured such that, according to the magnitude of the regenerative electric power being the magnitude of the absolute value of the power consumption Pc (<0) during the regeneration of the travel motor 6, the regeneration scale 24b of the number of lighting scales Nsc corresponding to the magnitude of the regenerative electric power is lit from the power running/regeneration boundary 24c as the reference point.

That is, the regeneration scale 24b is configured such that as the regenerative electric power during the regeneration of the travel motor 6 increases, more scales are lit and displayed along the counterclockwise direction of the arc from the power running/regeneration boundary 24c as the reference point.

Further, in the vehicle energy state display portion 54 of this embodiment, the eco-determination gauge 26 is displayed. The eco-determination gauge 26 is a gauge having a length corresponding to the number of lighting scales Nsc of the power meter 24 that corresponds to a threshold value of the power consumption Pc (hereinafter also referred to as a "power consumption threshold value Th_Pc") serving as a reference for determining whether or not the current operating state of the electric vehicle 100 is the eco-drive state. In this embodiment, the power consumption threshold value Th_Pc is set to a different value according to the magnitude of the vehicle speed Vs.

In general, as the vehicle speed Vs increases, the travel load (air resistance etc.) of the electric vehicle 100 increases, and therefore, even when the accelerator pedal operation amount of the driver is the same, the power consumption Pc increases compared to when the vehicle speed Vs is low.

Therefore, in this embodiment, by calculating the power consumption threshold value Th_Pc taking into account the change in the travel load due to the magnitude of the vehicle speed Vs, the eco-determination gauge 26 according to the power consumption threshold value Th_Pc can be accurately set as an index for determining whether or not the current operating state is the eco-drive state.

The eco-determination gauge 26 is disposed parallel to the power running scale 24a of the power meter 24 from the power running/regeneration boundary 24c as the reference point. Therefore, by referring to the display of the vehicle energy state display portion 54, the driver and so on can compare at a glance the number of lighting scales Nsc of the power running scale 24a and the length of the eco-determination gauge 26 and thus can easily grasp whether or not the current operating state is the eco-drive state.

The display manner of the power meter 24 and the eco-determination gauge 26 will be described in more detail below.

FIGS. 4A to 4D are diagrams for explaining the display manner of the power meter 24 and the eco-determination gauge 26 of this embodiment.

Figure 4A:
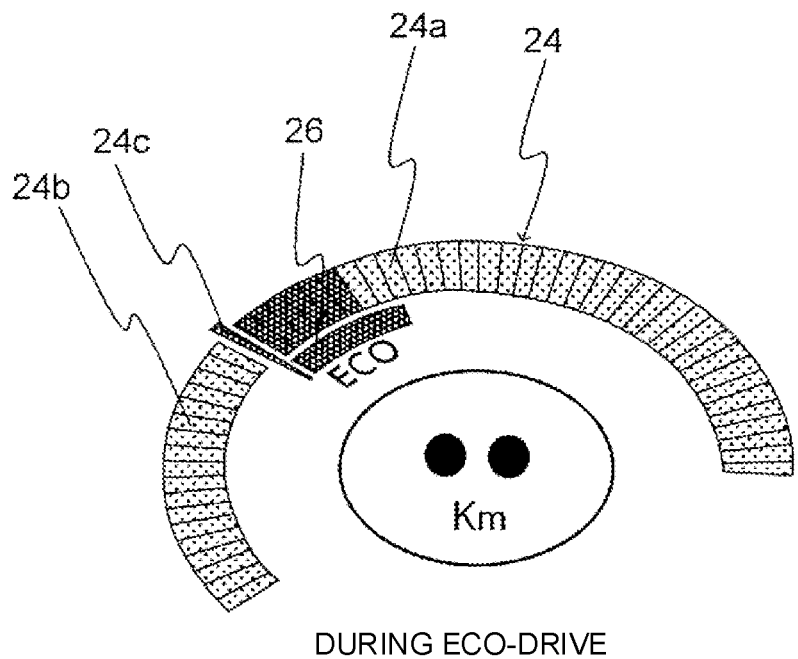
FIG. 4A is a diagram for explaining a display pattern example of a power meter and an eco-determination gauge.

In particular, FIG. 4A illustrates the display manner of the power meter 24 and the eco-determination gauge 26 in a scene where the operating state of the electric vehicle 100 is the eco-drive state. In the example illustrated in FIG. 4A, the lighting scales of the power meter 24 fall in an area shorter than the length of the eco-determination gauge 26. Therefore, the driver and so on viewing the display of the power meter 24 and the eco-determination gauge 26 can definitely recognize that the current operating state is the eco-drive state.

Figure 4B:
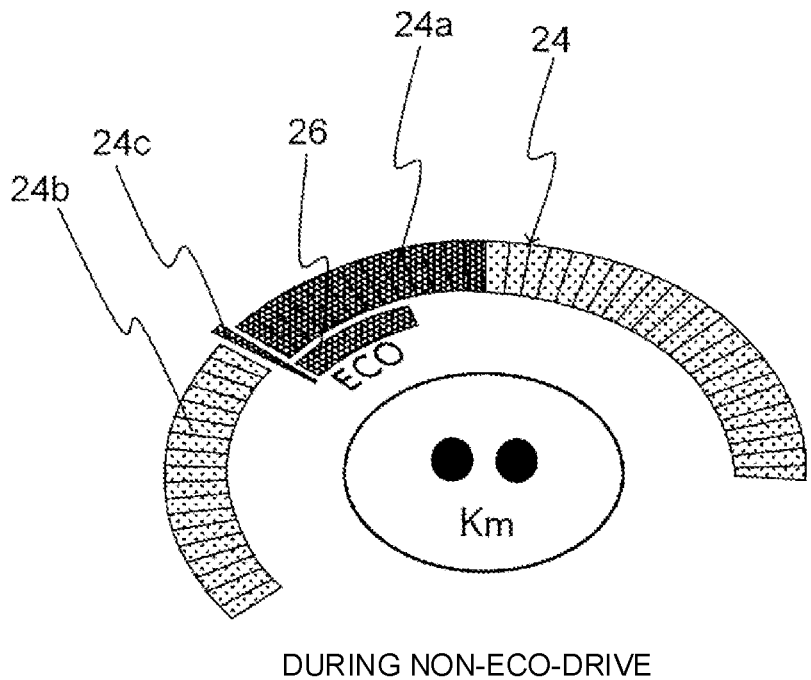
FIG. 4B is a diagram for explaining a display pattern example of the power meter and the eco-determination gauge.

FIG. 4B illustrates the display manner of the power meter 24 and the eco-determination gauge 26 in a scene where the operating state of the electric vehicle 100 is not the eco-drive state. In the example illustrated in FIG. 4B, the lighting scales of the power meter 24 extend to an area exceeding the length of the eco-determination gauge 26. Therefore, the driver and so on viewing the display of the power meter 24 and the eco-determination gauge 26 can definitely recognize that the current operating state is not the eco-drive state.

Figure 4C:
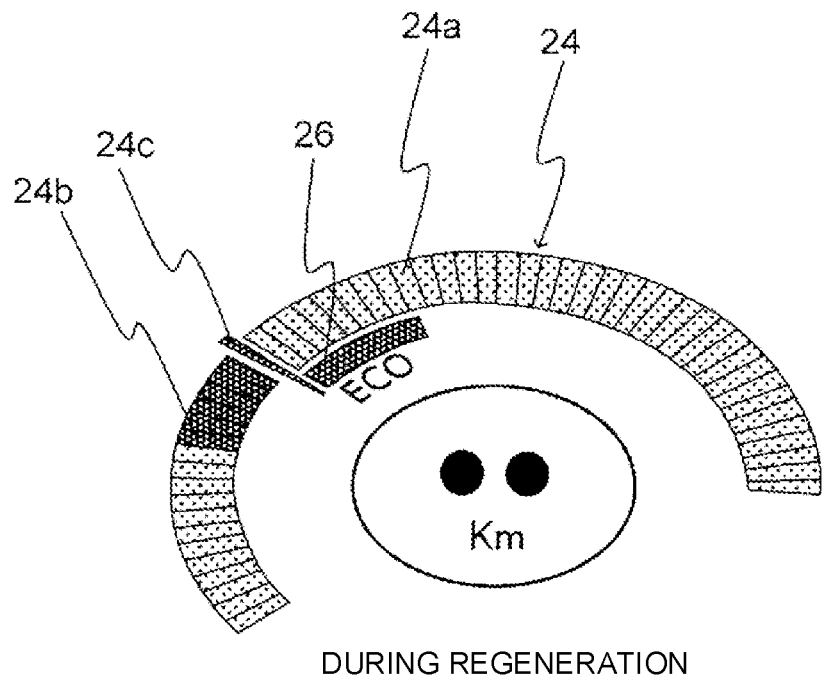
FIG. 4C is a diagram for explaining a display pattern example of the power meter and the eco-determination gauge.

Further, FIG. 4C illustrates the display manner of the power meter 24 and the eco-determination gauge 26 during the regeneration. In the example illustrated in FIG. 4C, instead of the power running scale 24a in the power meter 24, the regeneration scale 24b lights the scales of the number corresponding to the magnitude of the regenerative electric power.

Consequently, the driver can definitely recognize that the operating state of the electric vehicle 100 is the regenerative operation. During the regeneration, since the scales of the power running scale 24a are not lit as described above, the driver can recognize at a glance that the operating state is the regenerative operation without making a comparison between the power running scale 24a and the eco-determination gauge 26.

Figure 4D:
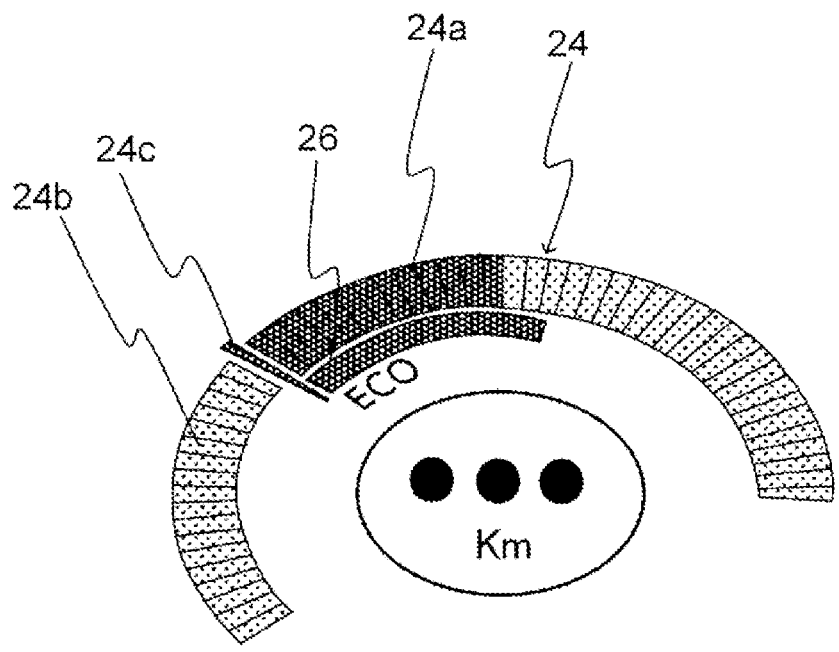
FIG. 4D is a diagram for explaining a display pattern example of the power meter and the eco-determination gauge.

FIG. 4D illustrates the display manner in which the length of the eco-determination gauge 26 is relatively prolonged. That is, it is assumed that, in a scene where the vehicle speed Vs is relatively increased, the length of the eco-determination gauge 26 is increased due to the power consumption threshold value Th_Pc being set to be relatively large as described above.

In the example illustrated in FIG. 4D, the number of lighting scales Nsc of the power meter 24 is the same as that in FIG. 4B where the operating state is not the eco-drive state. However, since the eco-determination gauge 26 is prolonged according to the magnitude of the vehicle speed Vs, the lighting scales of the power meter 24 fall in an area shorter than the length of the eco-determination gauge 26. Therefore, also in this case, by referring to the display of the power meter 24 and the eco-determination gauge 26, the driver and so on can definitely recognize that the current operating state is the eco-drive state.

On the other hand, referring back to FIG. 1, the display control controller 20b of the display device 20 is configured as an electronic control unit formed by a microcomputer including various calculation/control devices such as a CPU, various storage devices such as a ROM and a RAM, an input/output interface, and so on. Further, the display control controller 20b is programmed to perform a process (process of step S170 in FIG. 6) in the operating state display method according to this embodiment.

Figure 5:
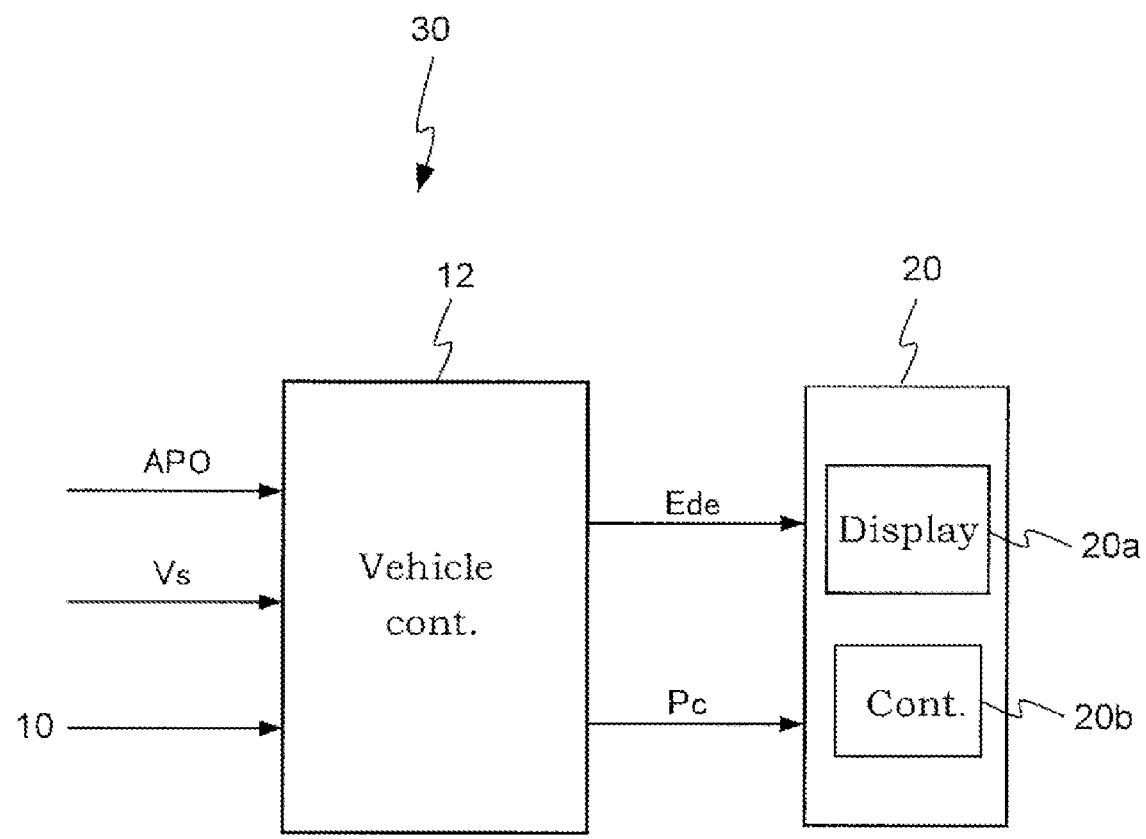
FIG. 5 is a block diagram for explaining the functions of the operating state display system of this embodiment.

FIG. 5 is a block diagram for explaining the functions of an operating state display system 30 in this embodiment.

As illustrated, the operating state display system 30 of this embodiment is formed by the vehicle controller 12 as a display control device, and the display device 20.

As already described, the vehicle controller 12 calculates the motor output OP by referring to the predetermined map based on the accelerator opening degree APO and the vehicle speed Vs. Then, the vehicle controller 12 sets the eco-level Ede according to the operating state of the electric vehicle 100 based on the vehicle speed Vs and the calculated motor output OP.

Further, the vehicle controller 12 calculates the power consumption Pc of the electric vehicle 100 based on the charge/discharge power of the battery 4 received from the battery controller 10. Further, the vehicle controller 12 calculates the number of lighting scales Nsc of the power meter 24 corresponding to the calculated power consumption Pc. In this embodiment, for the simplification of description, a description will be made assuming that the power consumption Pc of the electric vehicle 100 mainly corresponds to the motor output OP. However, the power consumption Pc may include the electric power consumed by accessories such as a heater, a compressor, and various valves.

Further, based on the vehicle speed Vs, the vehicle controller 12 sets the threshold value of the power consumption Pc (hereinafter also referred to simply as the "power consumption threshold value Th_Pc") serving as the reference for determining whether or not the current operating state of the electric vehicle 100 is the eco-drive state. Further, the vehicle controller 12 sets the number of lighting scales Nsc of the power meter 24 corresponding to the power consumption threshold value Th_Pc as the length of the eco-determination gauge 26. Further, the vehicle controller 12 transmits the eco-level Ede, the number of lighting scales Nsc, and the determination gauge length Ld_ec, respectively set, to the display device 20.

The display control controller 20b of the display device 20 performs a process of displaying the eco-level gauge 22, the power meter 24, and the eco-determination gauge 26 according to the received eco-level Ede, the received number of lighting scales Nsc, and the received determination gauge length Ld_ec in the respective areas of the meter panel 20a.

Next, the overall process of the operating state display method according to this embodiment will be described in more detail.

Figure 6:
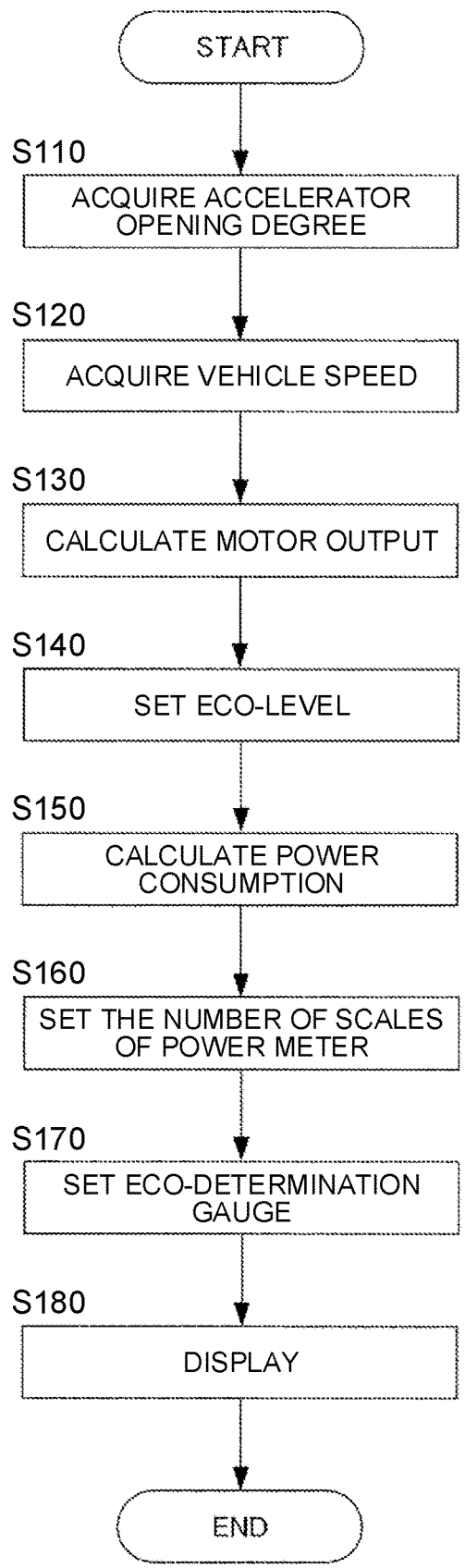
FIG. 6 is a flowchart for explaining the flow of the operating state display method.

FIG. 6 is a flowchart for explaining the flow of the operating state display method according to this embodiment. Steps illustrated in this flowchart are repeatedly performed at a predetermined calculation cycle. The processing order of the steps can be arbitrarily changed to the extent possible.

At steps S110 and S120, the vehicle controller 12 acquires an accelerator opening degree APO and a vehicle speed Vs.

At step S130, the vehicle controller 12 calculates a motor output OP. Specifically, the vehicle controller 12 calculates the motor output OP based on the predetermined map from the accelerator opening degree APO and the vehicle speed Vs acquired at step S120.

At step S140, the vehicle controller 12 sets an eco-level Ede.

Figure 7:
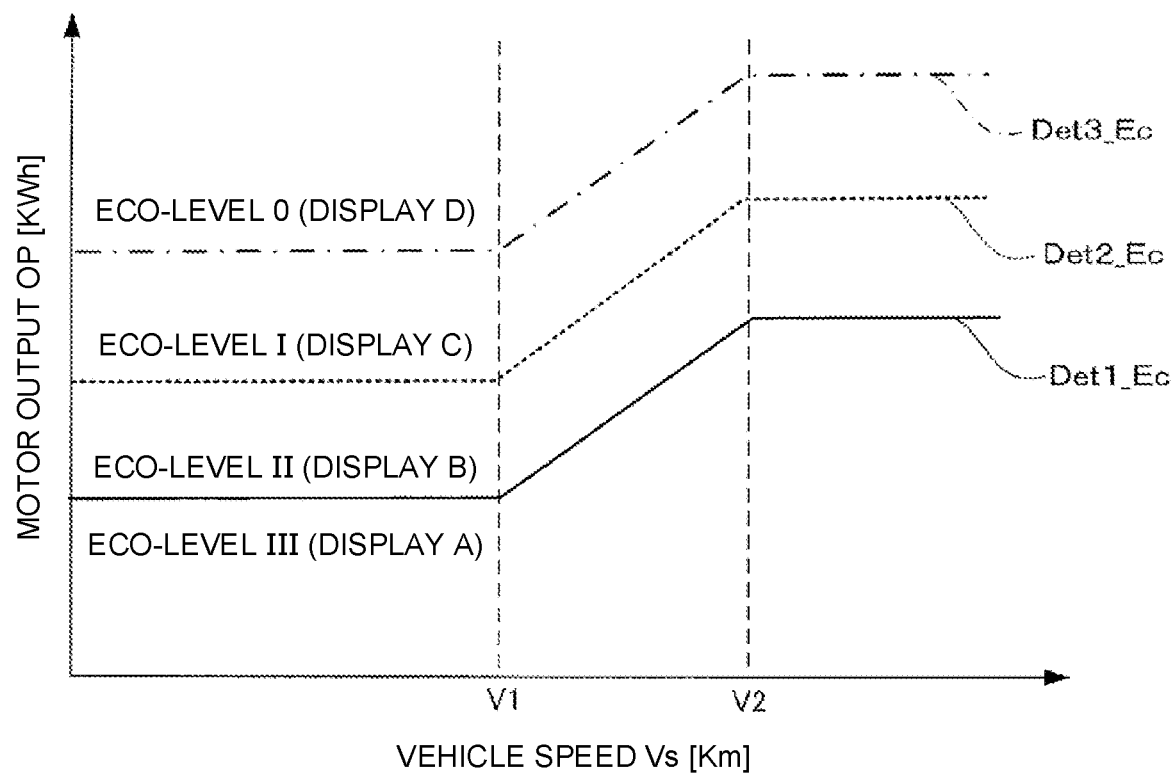
FIG. 7 is a diagram illustrating an eco-level setting map.

FIG. 7 is a diagram illustrating an eco-level setting map for setting the eco-level Ede according to this embodiment. In the eco-level setting map illustrated in FIG. 7, determination values of the eco-levels Ede are set according to the vehicle speed Vs and the motor output OP. The map is stored in advance in a non-illustrated storage unit of the vehicle controller 12.

The eco-level setting map defines ranges of the motor output OP according to the vehicle speed Vs that serve as references for selecting the display A, the display B, the display C, and the display D corresponding to the lengths of the eco-level gauge 22 illustrated in FIGS. 3A to 3D.

In this embodiment, a first eco-level determination value Det1_Ec (indicated by a solid line in FIG. 7) serving as a determination value between the eco-level III (display A) and the eco-level II (display B), a second eco-level determination value Det2_Ec (indicated by a dotted line in FIG. 7) serving as a determination value between the eco-level II (display B) and the eco-level I (display C), and a third eco-level determination value Det3_Ec (indicated by a dash-dot line in FIG. 7) serving as a determination value between the eco-level I (display C) and the eco-level 0 (display D) are respectively set.

Then, the vehicle controller 12 sets the eco-level Ede by referring to the eco-level setting map based on the vehicle speed Vs acquired at step S120 and the motor output OP calculated at step S130.

As seen from FIG. 7, at the same vehicle speed Vs, the eco-level tends to decrease as the motor output OP increases. On the other hand, in this embodiment, in a range where the vehicle speed Vs is from V1 to V2, the determination values Det1_Ec to Det3_Ec are each set to increase as the vehicle speed Vs increases. Then, in a range where the vehicle speed Vs is equal to or more than V2, the magnitude of each of the determination values Det1_Ec to Det3_Ec is again set to be constant.

This is for, in consideration of the range (V1 to V2) of the vehicle speed Vs in which it is conceivable that the travel load of the electric vehicle 100 increases to increase the power consumption Pc, amending each of the determination values Det1_Ec to Det3_Ec in an increasing direction as the vehicle speed Vs increases in this vehicle speed range. That is, when the vehicle speed Vs is relatively high, taking into account the increase factor of the power consumption Pc that occurs independently of the operation of the driver, each of the determination values Det1_Ec to Det3_Ec of the motor output OP for determining the eco-level de is increased (determination of the eco-level de is relaxed).

Referring back to FIG. 6, at step S150, the vehicle controller 12 calculates a power consumption Pc of the electric vehicle 100 based on the charge/discharge power of the battery 4. That is, based on the charge voltage and the charge current of the battery 4, the vehicle controller 12 calculates the electric power taken out of the battery 4 (the motor output OP+the electric power consumed by accessories and so on) as the power consumption Pc. During the regeneration of the electric vehicle 100, the power consumption Pc is calculated as a negative value. Therefore, the regenerative electric power during the regeneration can be calculated as an absolute value of the negative value of the power consumption Pc.

At step S160, the vehicle controller 12 sets the number of lighting scales Nsc of the power meter 24. Specifically, the vehicle controller 12 sets, as a unit power consumption, a value obtained by dividing the maximum value of the power consumption Pc, that is determined according to the specification of the electric vehicle 100, by the maximum number of scales of the power running scale 24a of the power meter 24, and determines, as the number of lighting scales Nsc of the power meter 24, a number obtained by dividing the power consumption Pc calculated at step S150 by the unit power consumption.

Then, at step S170, the vehicle controller 12 sets a power consumption threshold value Th_Pc based on the vehicle speed Vs and sets a length of the eco-determination gauge 26.

Figure 8:
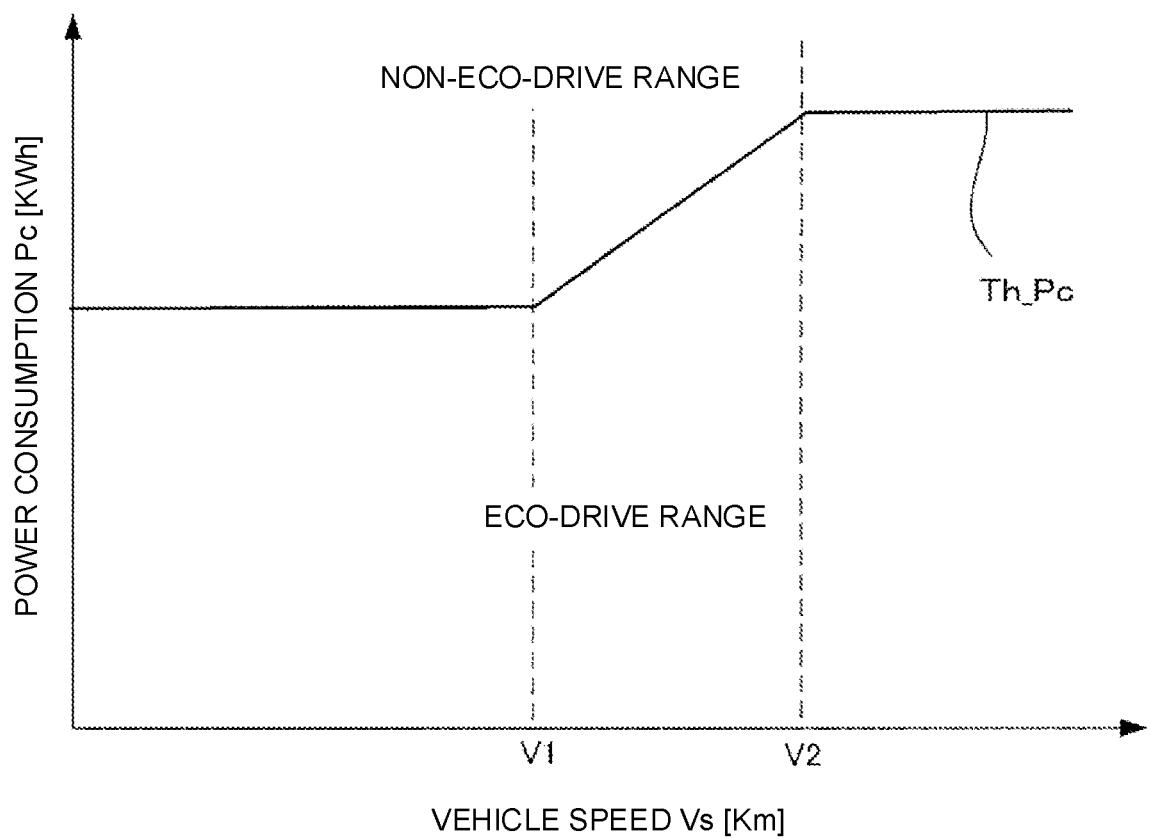
FIG. 8 is a diagram illustrating a power consumption threshold value setting map.

FIG. 8 is a diagram illustrating a power consumption threshold value setting map for setting the power consumption threshold value Th_Pc according to this embodiment. In the power consumption threshold value setting map illustrated in FIG. 8, the power consumption threshold values Th_Pc for determining the length of the eco-determination gauge 26 according to the vehicle speed Vs and the power consumption Pc are set. That is, in this embodiment, the length of the eco-determination gauge 26 is set based on the power consumption threshold value Th_Pc, associated with the vehicle speed Vs, that defines the boundary between the eco-drive state and the non-eco-drive state.

Specifically, the vehicle controller 12 sets, as the length of the eco-determination gauge 26, a length corresponding to the number of lighting scales Nsc of the power meter 24 calculated by the same method as at step S160 from the power consumption threshold value Th_Pc. Therefore, the length of the eco-determination gauge 26 is set to be longer as the power consumption threshold value Th_Pc becomes greater.

In particular, the power consumption threshold value setting map illustrated in FIG. 8 is set such that, corresponding to the eco-level setting map described in FIG. 7, the power consumption threshold value Th_Pc increases as the vehicle speed Vs increases in the range where the vehicle speed Vs is from V1 to V2. Then, in the range where the vehicle speed Vs is equal to or more than V2, the magnitude of the power consumption threshold value Th_Pc is set to be constant. Therefore, the length of the eco-determination gauge 26 is set to be the shortest in the range of vehicle speed Vs V1, set to increase gradually according to an increase in the vehicle speed Vs in the range of V1≤vehicle speed Vs≤V2, and set to be constant at the length after the increase in the range of V3≤vehicle speed Vs.

In this embodiment, by setting the length of the eco-determination gauge 26 using the power consumption threshold value setting map corresponding to the eco-level setting map described in FIG. 7 in this way, the change in the eco-level Ede calculated based on the eco-level setting map and the change in the length of the eco-determination gauge 26 set based on the power consumption threshold value setting map properly match each other.

At step S180, the display device 20 receives the power meter 24, the eco-determination gauge 26, and the eco-level Ede from the vehicle controller 12. Then, the display control controller 20b of the display device 20 lights the scales of the power meter 24 corresponding to the number of lighting scales Nsc set at step S160, and displays the eco-determination gauge 26 of the length set at step S170 in the vehicle energy state display portion 54 of the meter panel 20a.

Further, the display control controller 20b displays, along with the display of the power meter 24 and the eco-determination gauge 26, the display of the eco-level gauge 22 of the length corresponding to the eco-level Ede set at step S140 (one of the display A to the display D illustrated in FIGS. 3A to 3D).

Consequently, the driver and so on in the vehicle cabin of the electric vehicle 100 can visually recognize at a glance the power meter 24, the eco-determination gauge 26, and the eco-level Ede displayed in the meter panel 20a.

Next, the change in the display manner of the meter panel 20a by the above-described operating state display method will be described.

FIGS. 9A to 9D are diagrams for explaining examples of the display manner of the meter panel 20a according to the operating states of the electric vehicle 100 in this embodiment.

Figure 9A:
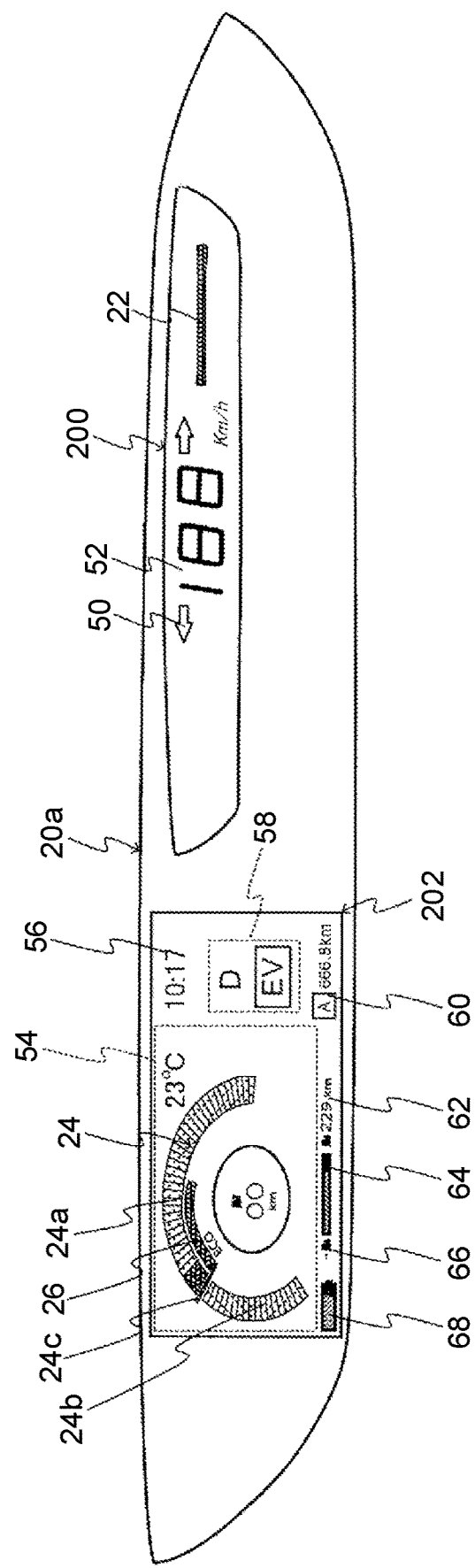
FIG. 9A is a diagram for explaining the display manner of the meter panel according to an operating state of the electric vehicle.

FIG. 9A illustrates the display manner of the vehicle energy state display portion 54 of the meter panel 20a when the length of the lighting scales of the power meter 24 corresponding to the number of lighting scales Nsc is less than ⅓ of the length of the eco-determination gauge 26. In this case, the eco-level Ede is determined to be the highest eco-level III so that the eco-level gauge 22 in the first display area 200 is displayed in the manner of the display A (see FIG. 3A).

Figure 9B:
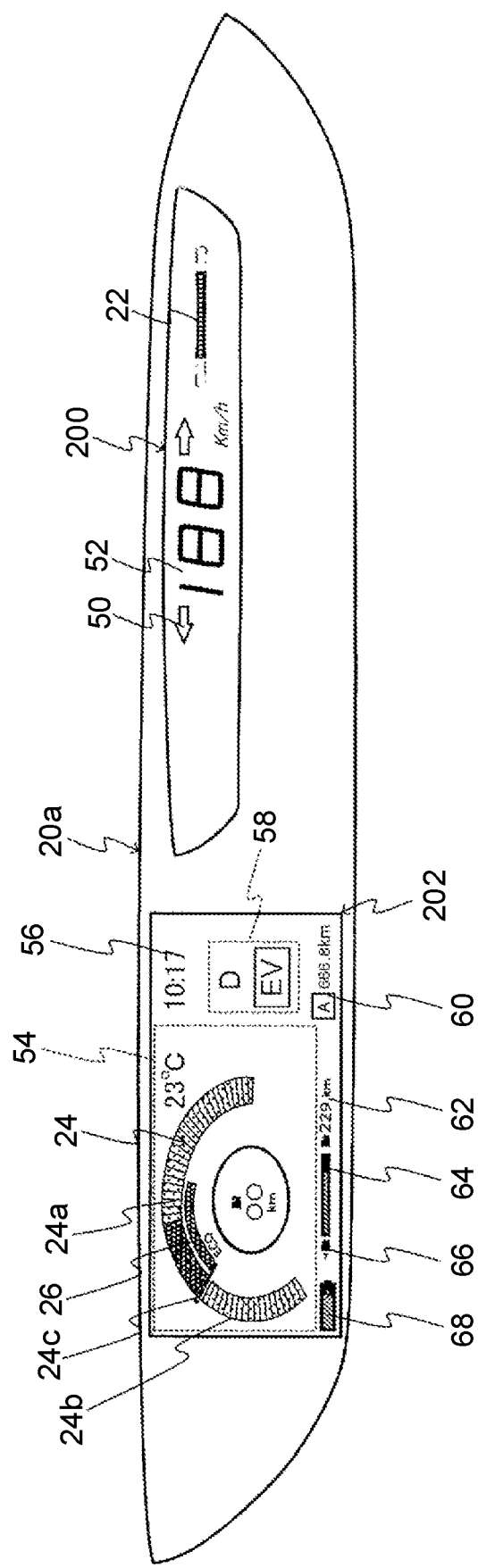
FIG. 9B is a diagram for explaining the display manner of the meter panel according to an operating state of the electric vehicle.

FIG. 9B illustrates the display manner of the vehicle energy state display portion 54 of the meter panel 20a when the length of the lighting scales of the power meter 24 corresponding to the number of lighting scales Nsc is ⅓ to less than ⅔ of the length of the eco-determination gauge 26. In this case, the eco-level Ede is determined to be the second-highest eco-level II so that the eco-level gauge 22 in the first display area 200 is displayed in the manner of the display B (see FIG. 3B).

Figure 9C:
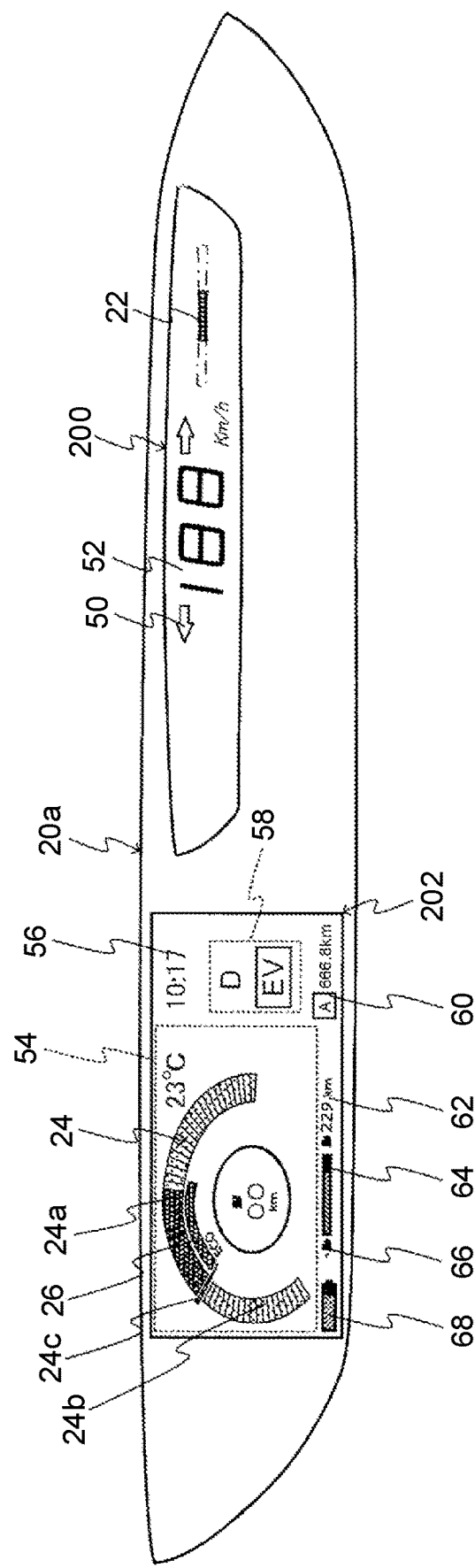
FIG. 9C is a diagram for explaining the display manner of the meter panel according to an operating state of the electric vehicle.

Further, FIG. 9C illustrates the display manner of the vehicle energy state display portion 54 of the meter panel 20a when the length of the lighting scales of the power meter 24 corresponding to the number of lighting scales Nsc is ⅔ to 1 or less of the length of the eco-determination gauge 26. In this case, the eco-level Ede is determined to be the third-highest eco-level I so that the eco-level gauge 22 in the first display area 200 is displayed in the manner of the display C (see FIG. 3C).

Figure 9D:
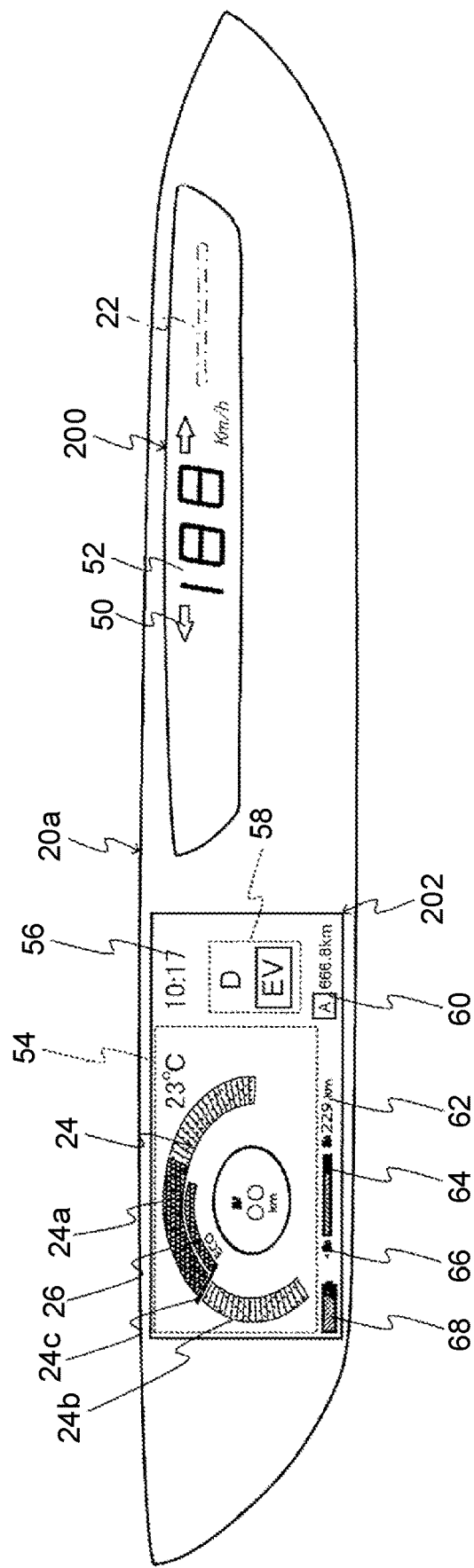
FIG. 9D is a diagram for explaining the display manner of the meter panel according to an operating state of the electric vehicle.

Then, FIG. 9D illustrates the display manner of the vehicle energy state display portion 54 of the meter panel 20a when the length of the lighting scales of the power meter 24 corresponding to the number of lighting scales Nsc is displayed to be longer than the length of the eco-determination gauge 26. In this case, the eco-level Ede is determined to be the lowest eco-level 0 so that the eco-level gauge 22 in the first display area 200 is displayed in the manner of the display D (see FIG. 3D).

Figure 9E:
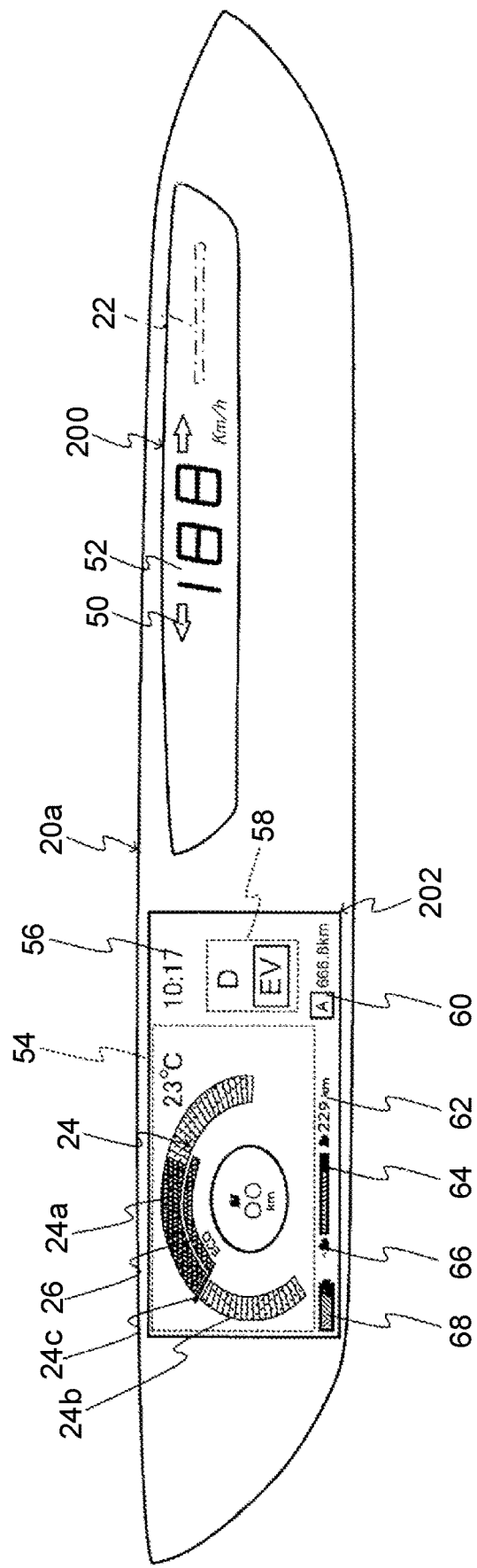
FIG. 9E is a diagram for explaining the display manner of the meter panel according to an operating state of the electric vehicle.

FIG. 9E illustrates the display manner of the vehicle energy state display portion 54 when while the length of the lighting scales of the power meter 24 corresponding to the number of lighting scales Nsc is the same as in the case of FIG. 9D, the eco-determination gauge 26 is displayed to be longer according to the vehicle speed Vs.

That is, in this case, while the magnitude of the power consumption Pc expressed by the power meter 24 is the same as in the case of FIG. 9D, since the power consumption threshold value Th_Pc is set to be higher taking into account an increase in the travel load due to an increase in the vehicle speed Vs (see FIG. 8), the eco-determination gauge 26 is displayed to be relatively long.

Therefore, the length of the number of lighting scales Nsc of the power meter 24 becomes ⅔ to 1 or less of the length of the eco-determination gauge 26. In particular, in this embodiment, as seen by referring to FIGS. 7 and 8 described above, the manner of the change in each of the eco-level determination values Det1_Ec to Det4_Ec according to the vehicle speed Vs and the manner of the change in the power consumption threshold value Th_Pc according to the vehicle speed Vs match each other. Therefore, in conjunction with the length of the lighting scales of the power meter 24 becoming ⅔ to 1 or less of the length of the eco-determination gauge 26 (like in the case of FIG. 9C), the eco-level Ede is also determined to be the eco-level I like in the case of FIG. 9C so that the eco-level gauge 22 in the first display area 200 is displayed in the manner of the display C (see FIG. 3C).

In this embodiment, the maps illustrated in FIGS. 7 and 8 are set such that the first eco-level determination value Det1_Ec and the power consumption threshold value Th_Pc coincide with each other with respect to the vehicle speed Vs of the electric vehicle 100. Therefore, in the case of this embodiment, the timing at which the length of the number of lighting scales Nsc of the power meter 24 and the length of the eco-determination gauge 26 approximately coincide with each other matches the timing of switching from the display C (eco-level I) to the display D (eco-level 0) of the eco-level gauge 22. Accordingly, in this embodiment, when the length of the number of lighting scales Nsc of the power meter 24 enters the non-eco-drive range exceeding the eco-determination gauge 26, the eco-level gauge 22 is just switched to the display D (length 0) in response thereto. According to the height of the eco-degree required for the driver, the second eco-level determination value Det2_Ec or the third eco-level determination value Det3_Ec, instead of the first eco-level determination value Det1_Ec, and the power consumption threshold value Th_Pc may match each other.

As described above, in this embodiment, while displaying the power meter 24 and the eco-determination gauge 26 in the vehicle energy state display portion 54 of the meter panel 20a, the eco-level gauge 22 is displayed in the first display area 200.

That is, by the display of the lighting scales of the power meter 24 corresponding to the power consumption Pc and the eco-determination gauge 26 of the set length, it is displayed whether or not the current operating state is the eco-drive state. On the other hand, since the eco-level gauge 22 is displayed so as to extend or contract according to the eco-level Ede set based on the current operating state (motor output OP), it is possible to realize the display of the eco-level gauge 22 that is properly linked to the display of the power meter 24 and the eco-determination gauge 26.

Consequently, according to the operating state display method of this embodiment, the expansion/contraction display of the eco-level gauge 22 that is properly linked to the display of the eco-drive state of the power meter 24 and the eco-determination gauge 26 can be provided to the driver and so on.

According to the operating state display method of this embodiment described above, the following operations and effects are exhibited.

In this embodiment, the operating state display method in the electric vehicle 100, in which the drive electric power is supplied from the battery 4 to the travel motor 6, is provided. The operating state display method includes an eco-level setting step of setting the eco-level de with respect to the operating state of the electric vehicle 100 based on the vehicle speed Vs of the electric vehicle 100 and the motor output OP being the output of the travel motor 6 (step S140 in FIG. 6), and a display step of displaying in the vehicle cabin the eco-level gauge 22 that expands or contracts according to the eco-level dc (step S180).

Consequently, the display of the eco-level gauge 22 reflecting the eco-degree in the actual operating state of the electric vehicle 100 can be performed for the driver and so on. That is, by providing to the driver and so on the display of the eco-level gauge 22 that expands or contracts in conjunction with the magnitude of the motor output OP corresponding to the actual power consumption Pc of the electric vehicle 100, compared to the case where the expansion/contraction display of the eco-level gauge 22 is performed based on the accelerator operation amount, the driver and so on can be made to recognize the eco-level de more properly reflecting the current operating state. Therefore, since the driver can more properly recognize the eco-degree with respect to the current operating state associated with his/her own driving operation, it is possible to more properly encourage the driver to be aware of the eco-drive.

Further, in this embodiment, the operating state display method further includes a power consumption calculation step of calculating the power consumption Pc of the electric vehicle 100 (step S150). Then, in the display step (step S180), the power meter 24 in which the number of scales (the number of lighting scales Nsc) increases or decreases according to the power consumption Pc is displayed along with the eco-level gauge 22.

Consequently, the driver and so on can visually recognize unitarily an increase or decrease in the power consumption Pc expressed by the scales of the power meter 24, and the display of the eco-level gauge 22 that expands or contracts according to the magnitude of the motor output OP (see FIGS. 9A to 9D). Therefore, the driver can be made to recognize the increase or decrease in the power consumption Pc displayed by the power meter 24 according to his/her own driving operation and the change in the eco-level gauge 22 being an index of the eco-degree that is properly synchronized with the increase or decrease in the power consumption Pc.

As a result, the driver can be made to recognize that the eco-level gauge 22 is more accurately linked with the increase or decrease in the power consumption Pc so that it is possible to give an incentive to the driver to perform by him/herself the driving operation with a higher eco-degree by referring to the expansion/contraction of the eco-level gauge 22. Consequently, the effect of encouraging the driver to be aware of the eco-drive is further improved.

In this embodiment, the operating state display method further includes a power consumption threshold value setting step of setting the power consumption threshold value Th_Pc (see FIG. 8) being the threshold value of the power consumption Pc for determining that the operating state of the electric vehicle 100 is the eco-drive state, and an eco-determination gauge setting step of setting the eco-determination gauge 26 indicating the length of the number of lighting scales Nsc of the power meter 24 corresponding to the power consumption threshold value Th_Pc (step S170). Then, in the display step (step S180), the eco-determination gauge 26 is displayed parallel to the power meter 24 (see FIGS. 4A and 4B).

Consequently, the driver and so on can determine the eco-drive state based on the visual information that can be easily recognized, i.e. as to whether or not the number of lighting scales Nsc of the power meter 24 exceeds the length of the eco-determination gauge 26.

On the other hand, the driver and so on can also recognize at a glance the length of the eco-level gauge 22 that is properly linked to the number of lighting scales Ns of the power meter 24 and the set length of the eco-determination gauge 26. As a result, while recognizing the eco-drive state by a comparison between the power meter 24 and the eco-determination gauge 26, the driver and so on can intuitively grasp the eco-degree by the display of the eco-level gauge 22 that is properly linked to the display of the power meter 24 and the eco-determination gauge 26 so as to expand or contract.

In particular, the driver can more objectively grasp by the display of the eco-level gauge 22 what degree of the eco-level de the number of lighting scales Ns of the power meter 24 corresponding to the power consumption Pc of the electric vehicle 100 based on his/her own driving operation corresponds to. As a result, it is possible to more properly give an incentive to the driver to perform more economical driving operation.

In this embodiment, in the eco-level setting step (step S140 in FIG. 6), by referring to the eco-level determination map (see FIG. 7) defining the relationship between the vehicle speed Vs of the electric vehicle 100, the motor output OP, and the first eco-level determination value Det1_Ec, the second eco-level determination value Det2_Ec, and the third eco-level determination value Det3_Ec being the eco-level determination values for determining that the eco-level de is the predetermined level (the eco-level 0, the eco-level I, the eco-level II, or the eco-level III), the eco-level is set from the vehicle speed Vs of the electric vehicle 100 and the motor output OP. In the power consumption threshold value setting step (step S170), by referring to the power consumption threshold value setting map (see FIG. 8) defining in advance the relationship between the vehicle speed Vs of the electric vehicle 100 and the power consumption threshold value Th_Pc, the power consumption threshold value Th_Pc is set from the vehicle speed Vs of the electric vehicle 100.

The eco-level determination map and the power consumption threshold value setting map of this embodiment are determined such that the first eco-level determination value Det1_Ec and the power consumption threshold value Th_Pc coincide with each other with respect to the same vehicle speed Vs.

Note that "coincide with each other" does not necessarily require that the first eco-level determination value Det1_Ec and the power consumption threshold value Th_Pc strictly coincide with each other as numerical values. That is, the meaning of "coincide with each other" includes that the timing at which the motor output OP reaches the first eco-level determination value Det1_Ec at a certain vehicle speed Vs, and the timing at which the power consumption Pc reaches the power consumption threshold value Th_Pc at the same vehicle speed Vs approximately coincide with each other.

Consequently, the display, as to whether or not it is the eco-drive range, expressed by the comparison between the length of the number of lighting scales Nsc of the power meter 24 and the length of the eco-determination gauge 26, and the display of the eco-degree by the expansion/contraction of the eco-level gauge 22 can be more properly linked to each other.

Further, in this embodiment, the operating state display system 30 for realizing the above-described operating state display method is provided.

Specifically, there is provided the operating state display system 30 that is installed in the electric vehicle 100 being the hybrid vehicle in which the generator 2 can charge the battery 4 using the power of the engine 1, the drive electric power is supplied from the battery 4 to the travel motor 6, and the motor output OP corresponding to the accelerator operation amount (the accelerator opening degree APO) can be selectively changed between at least two stages (the sport travel mode and the eco-travel mode).

The operating state display system 30 includes a mode switching switch for switching the travel mode of the electric vehicle 100, the eco-level gauge 22 as an eco-level display device provided to be visually recognizable by the driver of the electric vehicle 100 and configured to display in a switching manner a first display (display A, display B, or display C) indicating an operating state in which the power consumption efficiency of the travel motor 6 is at least high, and a second display (display B, display C, or display D) indicating an operating state in which the power consumption efficiency is lower than the first display, the power meter 24 as a power meter display device provided to be visually recognizable by the driver and configured to display an area where the motor output OP is indicated, and the vehicle controller 12 and the display control controller 20b as a display controller configured to control the display states of the eco-level gauge 22 and the power meter 24.

The vehicle controller 12 functions as a travel motor output calculation unit and a motor output threshold value setting unit.

The travel motor output calculation unit calculates a motor output OP and a power consumption Pc being values related to the motor output OP. The motor output threshold value setting unit sets a first eco-level determination value Det1_Ec, a second eco-level determination value Det2_Ec, and a third eco-level determination value Det3_Ec as threshold values related to the motor output OP. Further, the motor output threshold value setting unit sets a power consumption threshold value Th_Pc as a threshold value related to the motor output OP. Further, when the vehicle speed Vs is high, the motor output threshold value setting unit sets the first eco-level determination value Det1_Ec, the second eco-level determination value Det2_Ec, the third eco-level determination value Det3_Ec, and the power consumption threshold value Th_Pc to be greater than when the vehicle speed Vs is low.

On the other hand, the display control controller 20b functions as an eco-level display control unit and a power meter display control unit.

When the eco-level de is smaller than the first eco-level determination value Det1_Ec, the second eco-level determination value Det2_Ec, or the third eco-level determination value Det3_Ec being the threshold value, the eco-level display control unit causes the eco-level gauge 22 to display the display A, the display B, or the display C as the first display. When the eco-level de is greater than the first eco-level determination value Det1_Ec, the second eco-level determination value Det2_Ec, or the third eco-level determination value Det3_Ec being the threshold value, the eco-level display control unit causes the eco-level gauge 22 to display the display B, the display C, or the display D as the second display.

Further, in the second display area 202 as an area related to the motor output OP, the power meter display control unit displays the power consumption Pc as the value related to the motor output OP, and displays the power consumption threshold value Th_Pc as the threshold value related to the motor output OP so as to be comparable with the power consumption Pc.

In the operating state display system 30 of this embodiment, when the vehicle speed Vs is high, the motor output threshold value setting unit of the vehicle controller 12 sets the first eco-level determination value Det1_Ec, the second eco-level determination value Det2_Ec, the third eco-level determination value Det3_Ec, and the power consumption threshold value Th_Pc to be greater than when the vehicle speed Vs is low. Then, the power meter display control unit of the display control controller 20b changes the length of the eco-determination gauge 26 as a threshold value display of the power meter 24 when the power consumption threshold value Th_Pc is changed (according to the vehicle speed Vs).

With the operating state display system 30 thus configured, the above-described operating state display method can be properly performed.

Further, in this embodiment, there is provided an operating state display system 30 of another aspect that is installed in the electric vehicle 100 in which the drive electric power is supplied from the battery 4 to the travel motor 6. This operating state display system 30 includes a vehicle controller 12 being an operating state determination controller, a display control controller 20b, and a meter panel 20a being a display device having a first display area 200 as an eco-level display area and a second display area 202 as a power meter display area where display is performed based on a command of the display control controller 20b (see FIG. 2).

Further, the vehicle controller 12 sets an eco-level de with respect to an operating state of the electric vehicle 100 based on a vehicle speed Vs of the electric vehicle 100 and a motor output OP being an output of the travel motor 6, calculates a power consumption Pc of the electric vehicle 100, and sets the number of scales (the number of lighting scales Nsc) of a power meter 24, displayed in the meter panel 20a, according to the power consumption Pc. Then, the display control controller 20b displays in the first display area 200 an eco-level gauge 22 that expands or contracts according to the eco-level de, and displays the power meter 24 in the second display area 202.

The vehicle controller 12 further sets a power consumption threshold value Th_Pc being a threshold value of the power consumption Pc for determining that the operating state of the electric vehicle 100 is the eco-drive state (see FIG. 8), and the display control controller 20b further displays an eco-determination gauge 26, indicating the length of the number of lighting scales Nsc of the power meter 24 corresponding to the power consumption threshold value Th_Pc, parallel to the power meter 24 in the meter panel 20a (FIGS. 4A to 4D etc.).

The operating state display system 30 includes a storage unit storing an eco-level determination map (see FIG. 7) defining the relationship between the vehicle speed Vs of the electric vehicle 100, the motor output OP, and a first eco-level determination value Det1_Ec, a second eco-level determination value Det2_Ec, and a third eco-level determination value Det3_Ec being eco-level determination values for determining the eco-level de, and a power consumption threshold value setting map (see FIG. 8) defining in advance the relationship between the vehicle speed Vs of the electric vehicle 100 and the power consumption threshold value Th_Pc. Further, the eco-level determination map and the power consumption threshold value setting map are determined such that the eco-level determination value (the first eco-level determination value Det1_Ec) for determining that the eco-level de is a predetermined level, and the power consumption threshold value Th_Pc coincide with each other with respect to the same vehicle speed Vs.

Then, the vehicle controller 12 sets the eco-level de based on the vehicle speed Vs of the electric vehicle 100 and the motor output OP by referring to the eco-level determination map, and sets the power consumption threshold value Th_Pc based on the vehicle speed Vs of the electric vehicle 100.

Even with the operating state display system 30 thus configured, the above-described operating state display method can be properly performed.

(Modification)

Figure 10:
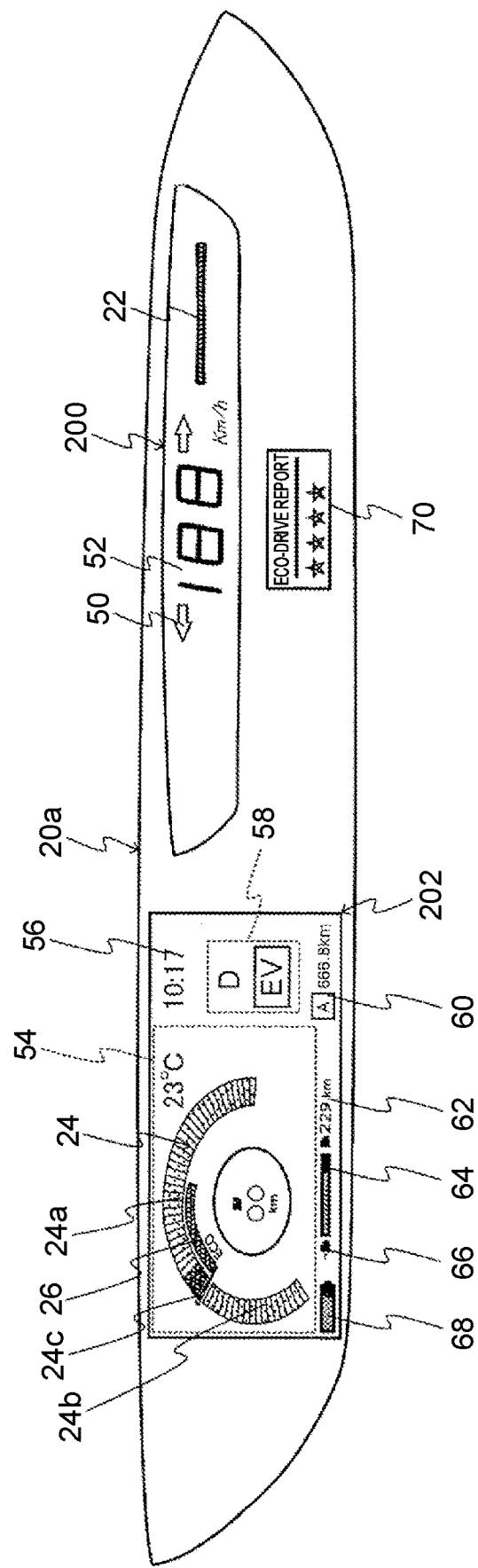
FIG. 10 is a diagram for explaining the display manner of a meter panel according to a modification of this embodiment.

FIG. 10 is a diagram for explaining a modification of the operating state display method and the operating state display system 30 according to this embodiment.

As illustrated, in this modification, the meter panel 20a further includes an eco-level evaluation display portion 70. The eco-level evaluation display portion 70 is an area for stepwise displaying an evaluation according to the eco-level de based on the operating state of the electric vehicle 100 during one trip.

In this modification, the display control controller 20b displays, in the eco-level evaluation display portion 70, an evaluation for the eco-degree of the operating state of the electric vehicle 100 during one trip based on at least one of the height of the eco-level de set at step S140 in FIG. 6, and the number of scales of the power meter 24 set at step S160.

One trip in this modification means a period of time from an operation of a non-illustrated reset button for clearing the display of the trip information display portion 60, or an ON operation of an ignition switch for starting the electric vehicle 100 (a start switch of the vehicle) to the next reset button operation or an OFF operation of the ignition switch.

In this modification, the vehicle controller 12 sets the number of asterisks (0 to 5 in FIG. 10) to display in the eco-level evaluation display portion 70 based on the transition of the eco-level de, the power meter 24, and the eco-determination gauge 26 that indicate the operating state of the electric vehicle 100 during one trip.

Then, triggered by the one-trip end operation (the next reset button operation or the OFF operation of the ignition switch), the display control controller 20b controls the meter panel 20a to display in the eco-level evaluation display portion 70 the number of asterisks set by the vehicle controller 12.

For example, the vehicle controller 12 calculates the average value based on the eco-levels I to III described in FIG. 7 for the eco-levels de set during one trip and determines the number of asterisks to display in the eco-level evaluation display portion 70 according to the average value. The relationship between the average value and the number of asterisks can be set in various ways according to the height of the standard for evaluation of the eco-degree.

For example, the number of asterisks can be set to 0 when the average value is 0 to 0.5, the number of asterisks can be set to 1 when the average value is 0.5 to 1.0, the number of asterisks can be set to 2 when the average value is 1.0 to 1.5, the number of asterisks can be set to 3 when the average value is 1.5 to 2.0, the number of asterisks can be set to 4 when the average value is 2.0 to 2.5, and the number of asterisks can be set to 5 when the average value is 2.5 or more.

In this way, by displaying the index of evaluation of the eco-degree during one trip in the eco-level evaluation display portion 70, the driver can recognize an objective evaluation on the average degree of the eco-drive with respect to his/her own driving operation during a certain period of time. Therefore, in this modification, in addition to the operations and effects obtained by the above-described embodiment, by making the driver recognize an objective evaluation in the driving operation over the certain period of time, it is possible to give an incentive to the driver to improve his/her own average driving operation over the certain period of time to more economical driving operation. As a result, it is possible to more properly encourage the driver to be aware of the eco-drive.

While the embodiments of the present invention have been described above, the above-described embodiments only show part of application examples of the present invention and are not intended to limit the technical scope of the present invention to the specific configurations of the above-described embodiments.

For example, the number of scales of the power meter 24, the length of the eco-determination gauge 26, the stages of the expansion/contraction length of the eco-level gauge 22, the number of the threshold values for determining the eco-level de (i.e. the number of levels of the eco-level de) described in FIG. 7, the magnitudes thereof, and the magnitude of the power consumption threshold value Th_Pc described in FIG. 8, which are described in the above-described embodiment, can be changed as appropriate.

Further, the display manner of the meter panel 20a illustrated in FIG. 2 can also be changed as appropriate. For example, the display device 20 may be configured such that, in the state where the eco-level gauge 22 is displayed in the first display area 200, the display of the vehicle energy state display portion 54 in the second display area 202 can be arbitrarily switched between a display of the energy flow indicating the flow of electric power between the engine 1, the battery 4, and the travel motor 6, a display of an odometer indicating the total mileage and a mileage during one trip, a display of information of charge history to the battery 4 by the regeneration and the power generation of the engine 1, a display of fuel consumption information, and a display of the power meter 24 and the eco-determination gauge 26.

Instead of the vehicle controller 12, a display controller having a function of causing the display device 20 to perform the operating state display method of the above-described embodiment may be provided to the display device 20.

The eco-determination gauge 26 in the above-described embodiment is basically used for comparison with the number of lighting scales Nsc of the power meter 24 during the power running of the travel motor 6 where the power consumption Pc takes a positive value. However, it may be configured that the regeneration scale 24b, that indicates the regenerative electric power during the regeneration of the travel motor 6 where the power consumption Pc takes a negative value, and the eco-determination gauge 26 may be linked to each other. For example, the display manner of the eco-determination gauge 26 may be changed between at the time of the power running and at the time of the regeneration such that the eco-determination gauge 26 is displayed in orange color during the power running, while the eco-determination gauge 26 is displayed in green color during the regeneration.

Consequently, the driver can more definitely distinguish between at the time of the power running and at the time of the regeneration by viewing the display of the eco-determination gauge 26, and therefore, during the regeneration, the driver can recognize the drive state without making any comparison between the number of lighting scales Nsc of the power meter 24 and the eco-determination gauge 26.

Further, in the above-described embodiment, for the simplification of description, the description has been made of the example in which the vehicle controller 12 calculates the power consumption Pc in the electric vehicle 100 based on the charge/discharge power of the battery 4. However, as described above, in the case where the electric vehicle 100 is the series hybrid vehicle in which the power-generation electric power of the engine 1 is supplied to the battery 4, since the power-generation electric power of the engine 1 is included in the charge/discharge power of the battery 4, it is conceivable that the power consumption Pc cannot be properly calculated only by the charge/discharge power of the battery 4. In view of this point, regarding as part of the power consumption Pc the power-generation electric power of the engine 1 obtained by consuming the fuel, the vehicle controller 12 may calculate the power consumption Pc in the electric vehicle 100 by subtracting the power-generation electric power of the engine 1 from the charge/discharge power of the battery 4.

On the other hand, from the viewpoint that since the power-generation electric power of the engine 1 is charged to the battery 4, the power-generation electric power of the engine 1 should not be evaluated as the electric power that is consumed in the electric vehicle 100 at the time of calculating the power consumption Pc, in order to exclude the power-generation electric power of the engine 1 in the calculation of the power consumption Pc, the sum of the motor output OP calculated based on the motor rotation speed, the voltage, the motor torque command value, and so on, and the electric power consumed by the accessories may be calculated as the power consumption Pc.

The configuration of the operating state display method and the operating state display system 30 of the above-described embodiment can be applied to an arbitrary type of electric vehicle using an electric motor as a travel drive source, such as a hybrid vehicle other than a series hybrid vehicle, an EV vehicle, or a vehicle equipped with a fuel cell, such as a polymer electrolyte fuel cell (PEFC) or a solid oxide fuel cell (SOFC), as a drive source of a travel motor or a drive source for charging a battery.

The invention claimed is:

1. An operating state display method for controlling a display state of a display device in an electric vehicle in which a drive electric power is supplied from a battery to a travel motor, the operating state display method comprising:
   calculating, by a controller, a motor output corresponding to the drive electric power;
   obtaining, by the controller, a vehicle speed; and
   causing, by the controller, the display device to display an eco-level gauge by referring to an eco-level determination map,
   wherein the eco-level gauge is calculated based on the motor output and the vehicle speed,
   wherein the eco-level determination map defines a relationship between the motor output, the vehicle speed, and eco-level determination values,
   wherein the eco-level determination values indicate stepwise degrees of a power consumption efficiency, and
   wherein a length of the eco-level gauge changes according to a magnitude relationship between the motor output and the eco-level determination values.

2. The operating state display method according to claim 1, further comprising:

calculating, by the controller, a power consumption of the electric vehicle based on a charge/discharge power of a battery;

causing, by the controller, the display device to display a power meter along with the eco-level gauge; and increasing or decreasing a number of scales of the power meter according to the power consumption.

3. The operating state display method according to claim 2, further comprising:

calculating, by the controller, a power consumption threshold value based on the power consumption and the vehicle speed by referring to a power consumption threshold value setting map, wherein the power consumption threshold value defines a boundary between an eco-drive state and a non-eco-drive state, and wherein the power consumption threshold value setting map defines a relationship between the power consumption, the vehicle speed, and the power consumption threshold value; and causing, by the controller, the display device to display an eco-determination gauge parallel to the power meter, wherein the eco-determination gauge indicates a length of the number of scales of the power meter corresponding to the power consumption threshold value.

4. The operating state display method according to claim 3, wherein the motor output corresponding to one of the eco-level determination values in the eco-level determination map and the power consumption threshold value in the power consumption threshold value setting map coincide with respect to the same vehicle speed.

5. An operating state display system installed in a hybrid vehicle in which a generator can charge a battery using a power of an engine, a drive electric power is supplied from the battery to a travel motor, and a motor output corresponding to the drive electric power can be selectively changed between at least two stages, the operating state display system comprising:

a mode switching switch for switching a travel mode of the hybrid vehicle;

an eco-level display device provided to be visually recognizable by a driver of the hybrid vehicle and configured to display an eco-level gauge configured to expand or contract according to an eco-level that stepwise indicates an energy consumption efficiency in an operating state of the hybrid vehicle;

a power meter display device provided to be visually recognizable by the driver and configured to display an area where the motor output is indicated; and a display controller configured to control display states of the eco-level display device and the power meter display device, wherein the display controller comprises:

a travel motor output calculation unit configured to calculate the motor output;

a motor output threshold value setting unit configured to set a plurality of threshold values related to the motor output, and configured to, when a vehicle speed is high, set the threshold values to be greater than when the vehicle speed is low;

an eco-level display control unit configured to:

cause the eco-level display device to perform a first display when the motor output is equal to or less than a first threshold value;

cause the eco-level display device to perform a second display when the motor output is greater than the first threshold value and equal to or less than a second threshold value; and cause the eco-level display device to perform a third display when the motor output is greater than the second threshold value; and a power meter display control unit configured to cause the eco-level display device to switch a display length of the eco-level gauge between the first display, the second display, and the third display.

6. The operating state display system according to claim 5, wherein:

the motor output threshold value setting unit is configured to, when the vehicle speed is high, set each of the first threshold value, the second threshold value, and the third threshold value to be greater than when the vehicle speed is low; and the power meter display control unit is configured to change a threshold value display of the power meter display device when at least one of the first threshold value, the second threshold value, or the third threshold value is changed.

* * * * *